UNITED STATES PATENT OFFICE.

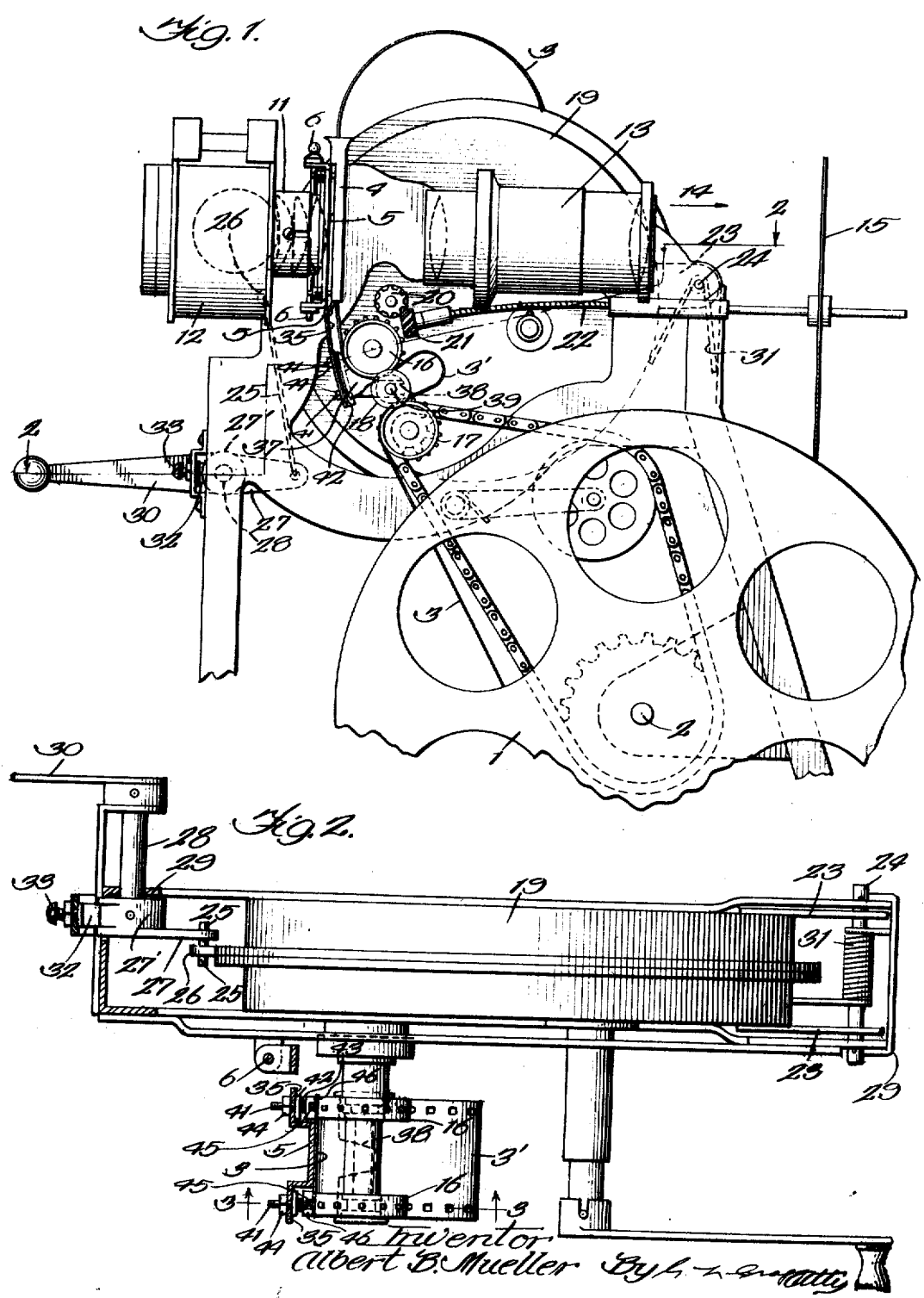

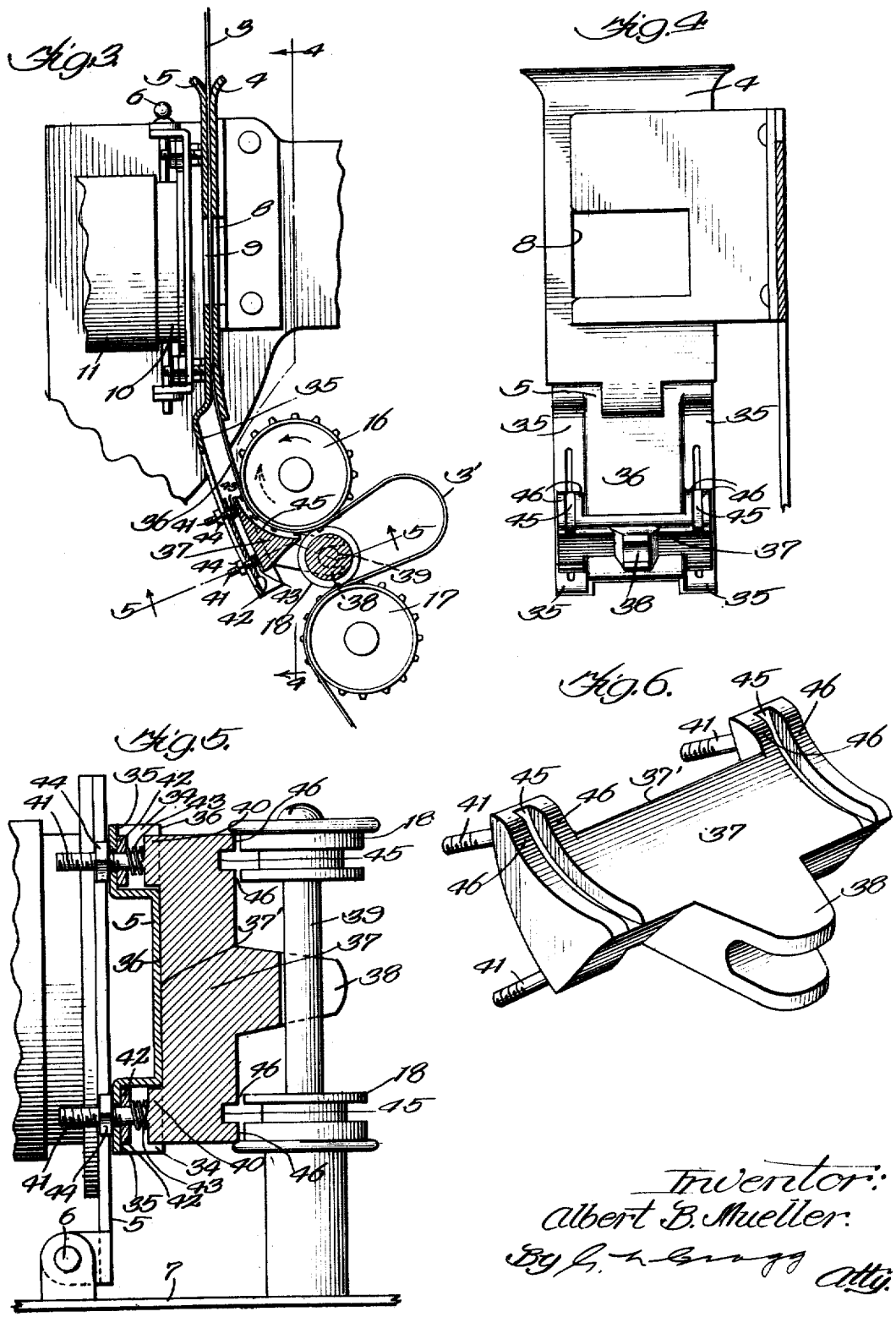

ALBERT B. MUELLER, OF CHICAGO, ILLINOIS.

PICTURE-PROJECTION APPARATUS.

1,348,656.

Specification of Letters Patent.

Patented Aug. 3, 1920.

Application filed November 7, 1917. Serial No. 200,689.

*To all whom it may concern:*

Be it known that I, ALBERT B. MUELLER, a citizen of the United States, residing at Chicago, in the county of Cook and State of Illinois, have invented a certain new and useful Improvement in Picture-Projection Apparatus, of which the following is a full, clear, concise, and exact description.

My invention relates to picture projection apparatus such as that which is employed in projecting motion pictures upon screens or that which is employed in printing positives from negatives, the pictures to be projected being disposed in succession upon films.

The apparatus of my invention includes intermittently operated gearing in engagement with a film to effect intermittent or step by step movement of the film.

It is one object of my invention to provide means for maintaining a film in engagement or in mesh with the intermittently operated gearing that effects the travel of the film.

It is another object of my invention not only to maintain the film and its actuating gearing in mesh but also to perform this function when the gearing is bodily shifted to adjust the film so that the pictures will be properly "framed".

In carrying out my invention I employ a shoe which is maintained in assembly with the aforesaid gearing and which performs the desired functions whether the gearing remains at rest or is such that it may be bodily adjusted.

I will explain my invention more fully by reference to the accompanying drawings showing the preferred embodiment thereof and in which Figure 1 is a view of so much of a picture projection apparatus as is necessary to show in order to understand my invention; Fig. 2 is a plan view of the structure shown in Fig. 1; Fig. 3 is a view on line 3—3 of Fig. 2; Fig. 4 is a view on line 4—4 of Fig. 3; Fig. 5 is a view on line 5—5 of Fig. 3; and Fig. 6 is a perspective view of the shoe.

Like parts are indicated by similar characters of reference throughout the different figures.

That which is normally the supply reel (not shown) and the reel 1 which is normally the winding reel are mounted to turn upon a shaft 2. The film 3 is fed from the supply reel downwardly through a guide that is formed of a stationary apron 4 and a swinging apron 5 that has hinged connection at 6 with the frame 7 of the apparatus. The aprons 4 and 5 are provided with registering rectangular openings 8 and 9. The apron 5 carries a rearwardly projecting tubular extension 10 with which the tubular extension 11 of the lamp house 12 has telescoping engagement. The tubular portions 10 and 11 are alined with the film openings 8 and 9 and with the lens chamber 13. The pictures upon the film are projected in the direction indicated by the arrow 14, there being a suitably operated shutter 15 that cuts off picture projecting light when each picture upon the film is being replaced by a succeeding picture at the openings 8 and 9, the shutter permitting the light to pass when each picture is stationary at the openings 8 and 9, all as is well understood by those skilled in the art. If the projection apparatus is used in printing from a negative film upon a positive film it will be modified to the necessary extent as will be apparent and I therefore use the term "projection" in its broadest sense as being applied to any form of apparatus through which a picture bearing film is progressing whether such film bears positives for the purpose of their projection upon a screen or bears negatives for the purpose of printing positives from such negatives.

In accordance with the structure set forth in my co-pending application, Serial No. 200,688, filed November 7, 1917, the film 3 is free of tight engagement with the aprons 4 and 5 whereby the film may be readily be moved in either direction between said aprons in "framing" and I prefer to employ this characteristic in my present invention though I am not to be limited thereto.

The gearing for effecting the intermittent or step by step movement of the film 3 in the presence of the aprons 4 and 5 in order that the pictures upon the film may be momentarily arrested in register with openings 8 and 9, is inclusive of the intermittently operated sprocket gear wheels or pinions 16. The means whereby these pinions 16 are intermittently operated forms no special part of my present invention and will not therefore be described in particular.

The gearing that effects the uniform travel of the film after it has passed by the pinions 16 includes the constantly running pinions 17 which are permitted to draw the film smoothly as it passes from the pinions 16 owing to the presence of slack $3^1$ that is maintained between the pinions 16 and 17. There are idlers 18 that maintain the film in mesh with the pinions 16 and 17 where it leaves the pinions 16 and enters into engagement with the pinions 17, these idlers being set forth in my co-pending application Serial No. 200,684 filed November 7, 1917.

The gearing for operating the pinions 16, 17 is contained in the circular gear casing 19, commonly called a "head" in this art. The pinions 16 and 17 and also the pinions 20 for operating the worm 21 and flexible shaft 22 to drive the shutter 15 are upon the exterior of the gear casing. The gear casing has two forwardly extending ears 23 which are journaled upon a rod 24 that is located in front of the gear casing, this rod affording a swinging mounting for such casing. For the purpose to be stated, the gear casing is provided with means for turning it upon its mounting 24, which means includes a stiff rod 25 connected at 26 with the gear casing at the upper end of the rod, the lower end of the rod being connected with the lever 27 rigidly secured upon the shaft 28 that is journaled in the frame 7 of the apparatus. The lever handle 30 is in rigid relation with the shaft 28 and is turned in one direction or the other according to the direction in which the gear casing 19 is to be swung upon its mounting 24. A coiled spring 31 engages the frame 7 at one end and a part of the gear casing 19 that is below the rod 24 and serves to have counterbalancing effect to offset the weight of the casing. The function of the spring 31 may be supplemented by the brake block 32 that is adjustably applied by a screw 33 to the hub $27^1$ of the arm 27, (this hub being concentric to the shaft 28) to render the engagement of the hub and the brake block uniform. The brake block, operating upon the hub $27^1$, also serves positively to hold the gear casing 19 in any position to which it is swung upon the rod 24. The "framing" of the pictures is accomplished, as is set forth in my aforesaid co-pending application Serial No. 200,688 filed November 7, 1917, Case F, by swinging the gear casing 19 to cause bodily movement of the pinions 16 and 17 about the axis of the rod 24. As the film 3 is not in tight engagement with the aprons 4 and 5 the film may be slipped up and down therebetween according to the direction in which the pinions 16 and 17 are bodily moved in company with the gear casing 19. These features are broadly claimed in my latter aforesaid co-pending application, the device of my present invention being specifically different from that which is shown in said co-pending application and while the device of my present invention is employed in conjunction with the swingingly mounted gear casing 19, I do not wish to be limited to such an association.

The rear apron 5 has the lower end of its sides offset as indicated at 34. These offset portions 34 have curved faces 35 and the lower part of the apron 5 which is not offset has a curved face 36, the faces 35 and 36 being concentric with the rod 24. A normally stationary non-rotating shoe 37 has a bifurcated extension 38 that embraces a shaft 39 of the idlers 18 whereby such shoe is assembled into coöperative relation with the pinions 16. This shoe has a curved face $37^1$ that conforms to the curvature of the face 36 of the apron 5. The shoe has flanges 40 which extend into the offset portions 34. Screws 41 extend rearwardly from the shoe and pass through plates 42 conforming in curvature with the curved faces 35. The face $37^1$ of the shoe may or may not ride upon the face 36 of the apron 5 according to the adjustment of the shoe. Plates 42, however, are normally adapted to ride upon the curved faces 35, these plates 42 being maintained in engagement with the faces 35 by means of the coiled springs 43 that surround the screws 41. Nuts 44 upon the screws engage the rear side of the apron 5 and serve to regulate the pressure of the springs 43 upon the plates 42 that are upon the front side of the apron 5. By means of the bifurcated extension 38 of the shoe, the screws 41 and the parts coöperating with these screws, the shoe is maintained in association with the pinions 16 illustrated. The shoe has curved grooves 45 that are co-axial with the pinions 16, very slight clearance intervening between the pinion teeth and the bottoms and sides of these grooves. The bottoms of the grooves 45, by closely approaching the crowns of the teeth of the gearing 16 where the film is in mesh with such teeth, prevent the film from becoming unmeshed. The shoe has a facial portion substantially co-axial with the gearing 16 that includes curved faces 46 (alongside of the grooves 45) that are concentric with the pinions 16, the springs 43 serving to press the faces 46 upon the film at places alongside of the teeth of the pinions 16 to insure the meshing of the film with such teeth and to prevent undue slippage of the film upon said pinions since the faces 46 press the film upon the untoothed peripheral portions of the pinions 16.

In view of the assembly of the shoe 37 with the pinions 16 which has been described the shoe and parts pertaining thereto will be bodily moved with said pinions when the gear casing 19 is swung up or down upon its mounting 24 and the shoe will continue to function as described in each of the positions to which the pinions 16 may be bodily moved. When it is necessary to bodily move the pinions 16 upwardly the unmeshing of the film from such pinions will be avoided because of the relation of the shoe to the film and said pinions that has been described. Moreover, the shoe then serves to prevent undue buckling of the portion of the film intervening between the lower ends of the aprons 4 and 5 and the pinions 16.

When the film is properly "framed" the shoe also serves to maintain the film in mesh with the pinions 16 and I do not therefore wish to be limited to the bodily adjustment of the shoe and pinions 16.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

Picture projection apparatus including gearing and a picture bearing film engaged by said gearing, in combination with a normally stationary non-rotating shoe having a curved facial portion substantially co-axial with said gearing and disposed close to the gearing where the gearing teeth are in mesh with the film, and means for bodily moving said gearing and shoe together to adjust the film.

In witness whereof, I hereunto subscribe my name this eighth day of October A. D., 1917.

ALBERT B. MUELLER.